US010753830B2

(12) United States Patent
Carroll

(10) Patent No.: US 10,753,830 B2
(45) Date of Patent: Aug. 25, 2020

(54) METHOD AND APPARATUS FOR CONTROLLING SAMPLING OF EVENTS INVOLVING A FLUID CONTROL

(71) Applicant: Dean Carroll, Georgetown, TX (US)

(72) Inventor: Dean Carroll, Georgetown, TX (US)

( * ) Notice: Subject to any disclaimer, the term of this patent is extended or adjusted under 35 U.S.C. 154(b) by 744 days.

(21) Appl. No.: 14/217,525

(22) Filed: Mar. 18, 2014

(65) Prior Publication Data

US 2014/0277779 A1 Sep. 18, 2014

Related U.S. Application Data

(60) Provisional application No. 61/802,965, filed on Mar. 18, 2013.

(51) Int. Cl.
*G01N 1/10* (2006.01)

(52) U.S. Cl.
CPC ....... *G01N 1/10* (2013.01); *G01N 2001/1093* (2013.01)

(58) Field of Classification Search
CPC .................. G01N 1/10; G01N 2001/1093
See application file for complete search history.

(56) References Cited

U.S. PATENT DOCUMENTS

| | | | | |
|---|---|---|---|---|
| 5,101,670 A * | 4/1992 | Steger | | G01N 1/2035 73/863.03 |
| 5,172,332 A * | 12/1992 | Hungerford | | E03F 7/00 700/267 |
| 5,587,926 A * | 12/1996 | Chiu | | E03F 7/00 702/179 |
| 2003/0115109 A1 * | 6/2003 | Rogers | | G01F 25/0007 705/27.1 |
| 2011/0266056 A1 * | 11/2011 | Pop | | E21B 49/08 175/50 |
| 2013/0124113 A1 * | 5/2013 | van Dal | | G06F 19/00 702/45 |
| 2016/0032719 A1 * | 2/2016 | Chen | | G01N 21/274 702/6 |

* cited by examiner

*Primary Examiner* — Mohamed Charioui
*Assistant Examiner* — Eyob Hagos
(74) *Attorney, Agent, or Firm* — Isidore PLLC

(57) ABSTRACT

A method and apparatus controls the sampling of a fluid flow related event by: receiving a selection of one or more situational parameters and a selection of a calculation basis parameter and value; performing a computation that calculates and outputs a result containing a listing of parameters and two sets of associated parameter values corresponding to a flow trigger, based on the selected calculation basis parameter and the selected situational parameters. The parameter values include both a precise computational result and a situation-specific best fit result. The method includes triggering a sampling mechanism to initiate collection of samples of the fluid flow based on the best fit result. The computation of the result comprises: executing a fluid flow trigger calculation program that computes the flow trigger based on an analysis of both the situational parameters with associated situational parameter values and the selected calculation basis parameter.

22 Claims, 8 Drawing Sheets

METHOD AND APPARATUS FOR CONTROLLING SAMPLING OF EVENTS INVOLVING A FLUID CONTROL

PRIORITY

The present application claims priority from U.S. Provisional Application No. 61/802,965 filed on Mar. 18, 2013, the contents of which is incorporated herein by reference in its entirety.

BACKGROUND

1. Technical Field

The present disclosure generally relates to a flow control apparatus, and in particular to a method and device for determining a flow trigger for controlling sampling of a fluid flow.

2. Description of the Related Art

Analysis of fluid flows, such as performed at a wastewater plant or for an ecological study of a river system, involves the collection of samples of the fluid flow over some period of time, typically on the order of a day, a week, etc. Devices designed to perform these collections typically include collection parameters. When the device is initially placed on location to begin the collection cycle(s), a collection engineer (i.e., the person setting up the collection machine to collect the sample(s) typically has to determine by memory recollection and or on-site calculation via a separate device, such as a calculator, what values to set for one or more parameters. Once the parameter value is determined and set for the collection mechanism, however, the collection engineer typically has no way of knowing, without further calculation, how that selected value affects any of the other parameters that may be important in the collection of the samples.

For example, the collection engineer may set the device to collect 10 samples over a 24 hour period; However, the size of the container will determine how many samples and how much each sample can be to collect 10 samples, and even these values may also be based in part on the actual flow recorded for the fluid. Further the values must be fit to the application, as some precise results are not possible within the resolution of the equipment in an application. The engineer has no way of really knowing what these connections are, without performing some time-intensive evaluation and/or calculations using secondary devices and historical charts, etc. A need thus exists for a quicker and more efficient and accurate way for dispatching these devices on location without having to manually perform the calculations and/or evaluations and/or requiring personal knowledge of specific situational parameters that affect the fluid flow or sampling thereof.

BRIEF SUMMARY

Disclosed are a method, apparatus, and computer program product that controls the sampling of an event involving a fluid flow by receiving one or more situational parameters for utilization in a flow sampling event being programmed; updating a value associated with a selected situational parameter in response to receiving an entry of one or more values of the selected situational parameter; receiving an input selection of at least one calculation basis parameter among multiple selectable calculation basis parameters and receiving an entry of a corresponding CBP value of the selected CBP. Receiving the one or more situational parameters can include one or more of: (a) displaying available situational parameters and receiving an input of a corresponding parameter value to assign to each of the selected one or more situational parameters and (b) selecting at least one previously determined situational parameter, which includes a corresponding pre-stored parameter value assigned to the at least one previously determined situational parameter.

The method, apparatus, and computer program product further includes: performing a computation that calculates a result containing one or more values corresponding to a flow trigger based on the selected calculation basis parameter and the corresponding CBP value entered and the values of the one or more situational parameters; and enabling a sampling mechanism to initiate collection of samples of the fluid flow based on the determined one or more values corresponding to the flow trigger.

According to one embodiment, performing a computation that calculates the result includes: executing a fluid flow trigger calculation (FFTC) program that computes the flow trigger based on an evaluation including (a) one or more situational parameters and (b) the selected calculation basis parameter. The FFTC program computes a best flow trigger represented by the calculated best fit result whose values are calculated based on the selected calculation basis parameters and values of the selected one or more situational parameters.

Additionally, according to one or more embodiments, the method further includes: outputting the result as a listing of parameters with both raw, unfitted parameter values of the calculation and calculated best fit parameter values; enabling user modification of a parameter value of at least one parameter to an updated parameter value for one or more of the situational parameters and the calculation basis parameter to be used in a recalculation, based on a user determination of whether or not the calculated and outputted results are acceptable; and enabling user selection of a different calculation basis parameter and entry of a corresponding new CBP value. The calculated result parameter values comprise two series of situation-specific values showing the actual precise calculated values and a best-fit value associated with a set of result parameters. The best fit result parameter values indicate actual values that will be implemented with the flow trigger program activation.

The method further includes: in response to a first input selection indicating acceptance of the outputted result, triggering the sampling mechanism to perform collection of samples based on the outputted best fit result values; and in response to a modification of at least one component utilized in generating the result, performing a new calculation to generate a new result utilizing the FFTC program with parameters and parameter values that account for the modification. According to one aspect of the disclosure, the listing of situational parameters can include a plurality of parameters such as total volume to collect, duration volume per pulse/contact closure, average daily flow. Also, the actual and best fit result parameters can include: trigger, trigger count in pulses/contact closures, individual sample volume, number of samples, total volume to be collected, duration, and interval between samples.

According to one aspect of the disclosure, the method further includes: receiving event data indicating one or more flow conditions of a fluid flow monitored over at least one timeframe; and in response to receiving the event data, autonomously modifying one or more situational parameters, by re-calculating the values of the one or more situational parameters based on the event data received to generate updated values. The event data is received from a flow sensor associated with the sampling mechanism. Further, in one or more embodiments, the method includes: storing the updated values in a storage device communicatively coupled to the processor, so that the updated values are accessible for use during subsequent sampling runs; and performing the calculation to determine the flow trigger in at least one subsequent sampling run over a second timeframe utilizing the updated values of the situational parameters.

According to yet another aspect of the disclosure, the method includes: displaying, on a display device that is communicatively connected to the processor, a user interface having one or more areas for receipt of the at least one input selection; identifying within the user interface which selectable calculation basis parameters can be selected via the user interface; enabling toggling between the user interface displaying the calculation basis parameters and at least one additional user interface displaying at least one situational parameter along with an initial value assigned to the situational parameter; providing a prompt within the user interface for selection of one of the calculation basis parameters and entry of a corresponding CBP value for use in performing the calculation of the flow trigger; and in response to not receiving a selection of one or more inputs from among one or more of a calculation basis parameter and a corresponding value within a pre-established time-out period, returning to a home screen display interface. With the available input selections, the value of a situational parameter can be changed by entry of a different value via the additional user interface.

According to one aspect of the disclosure, the calculation basis parameters comprise at least one of sample volume, flow trigger, and number of samples; the situational parameters comprise at least one of duration, volume per pulse, volume per contact, average daily flow, and volume to be collected; and the performing a calculation comprises calculating a best flow trigger to obtain results that correlate to the selected calculation basis parameter, CBP value, and initial or user entered values specified for the situational parameters utilized.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein.

DETAILED DESCRIPTION

Figure 1:
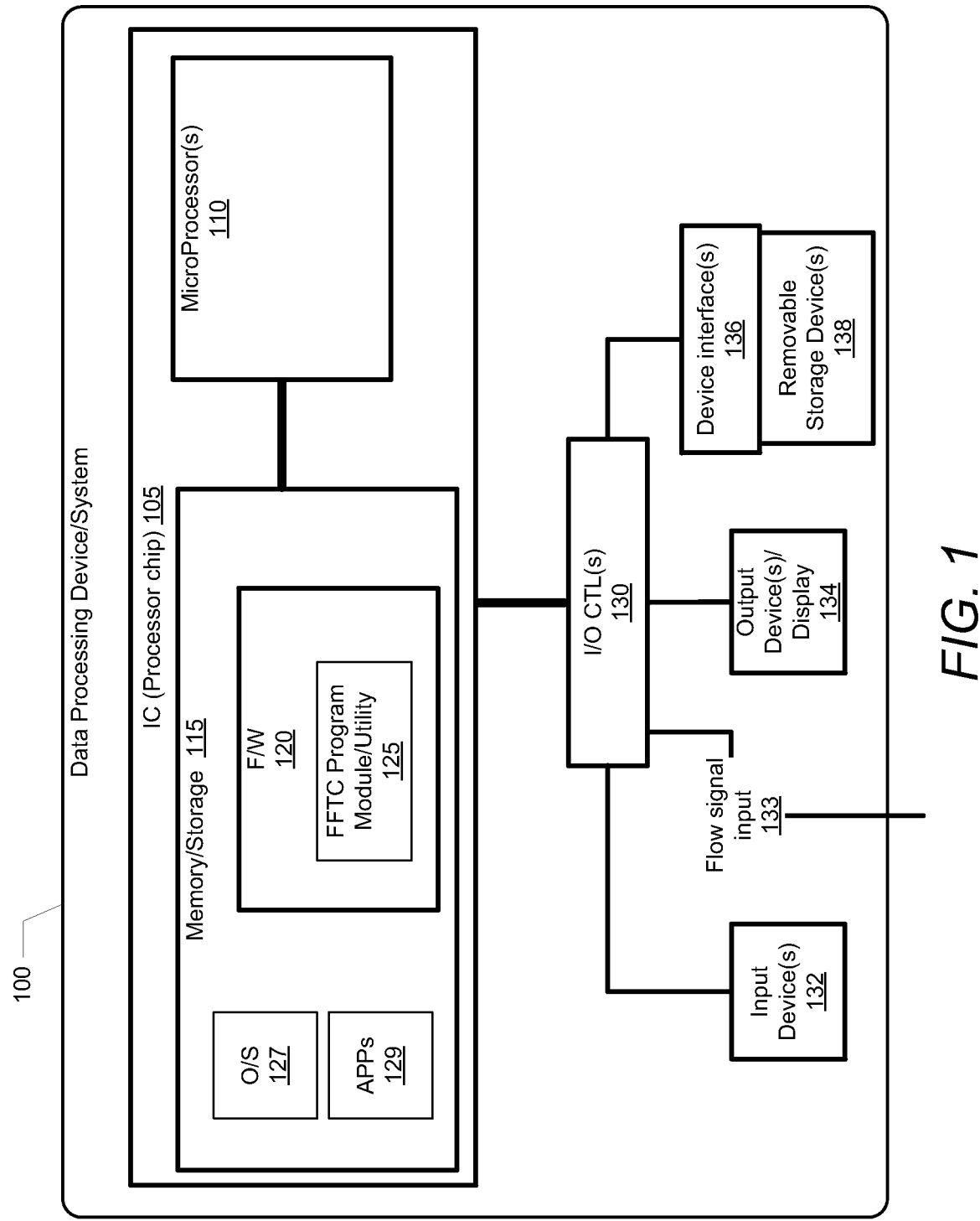
FIG. 1 provides a block diagram representation of an example data processing device on an integrated circuit with which one or more of the described embodiments can be practiced.

The illustrative embodiments provide a method, apparatus, and computer program product that controls the sampling of a fluid flow related event by receiving a selection of one or more situational parameters and a selection of a calculation basis parameter; performing a computation that calculates and outputs a result containing a listing of parameters and two sets of associated parameter values corresponding to a flow trigger, based on the selected calculation basis parameter and the selected situational parameters. The parameter values include both a precise computational result and a situation-specific best fit result. The method includes triggering a sampling mechanism to initiate collection of samples of the fluid flow based on the best fit result. The computation of the result comprises executing a fluid flow trigger calculation program that computes the flow trigger based on an analysis of both the situational parameters with associated situational parameter values and the selected calculation basis parameter.

According to one or more aspects, the disclosure provides a processor-implemented method enabled by execution of firmware and/or program code including code that performs the functions of a fluid flow trigger calculation (FFTC) program. The processor-implemented method provides the user of a fluid sampler (also referred to herein as a fluid sampling device/mechanism) two sets of calculated results to be used to set a flow trigger level for an event related to a fluid flow, such as at a wastewater plant, for example. In one or more of the embodiments, the FFTC program computes a best (or closest) flow trigger to obtain specific user-requested results. The FFTC program computes the trigger based on duration, volume (e.g., gallons or liters) per pulse or contact, average daily flow, volume to be collected, and one of three parameters that the user selects as the basis for the calculations. According to one or more of the described embodiments, the three user selectable parameters, referred to herein as the calculation basis parameters, include 'sample volume', 'trigger (Flow)', and 'number of samples'. In one embodiment, the user can also select the situational parameters and associated parameter values. In another embodiment, the situational parameters can be stored on an accessible storage device and retrieved by the FFTC program as default situational parameters for the computation.

Once the processor executing the FFTC program completes the calculation, the resulting list of parameters (collectively, trigger, pulse or contact count, duration, volume to be collected, interval between samples, sample volume, and sample count) and the corresponding calculated parameter values and the best fit calculated parameter values are outputted together so the user can evaluate whether to utilize the outputted set of parameter values or alter one or more of the parameters. According to one aspect of the disclosure, altering a calculation of one or more of the parameter values, or modifying the selected situational parameter or situational parameter values, or selecting a different calculation basis triggers the FFTC program to perform a new computation which yields a different set of output result.

According to one additional aspect of the disclosure, the FFTC program includes code for enabling the sampler to track the flow for each time period (e.g., each day) and then utilize that received (monitored/tracked) data to recalculate the values assigned to one or more of the parameters and use the re-calculated values for the next run of the program. Because the flow being measured is expected to and typically varies, this autonomous tracking and autonomous re-calculation of parameter values saves the man hours and brain power that would be otherwise required for the sampling engineer having to calculate and re-enter a Flow Trigger each time the program is to run.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

With reference now to the figures, and beginning with FIG. 1, there is depicted a block diagram representation of an example data processing device/system, as utilized within one embodiment. The data processing device can be described as having features common to an application specific integrated circuit (ASIC) and/or as existing on an ASIC. However, as used herein, the term "data processing device" is intended to include any type of computing device or machine that is capable of receiving, storing and running a software product and retrieving data/instructions from a storage device. Therefore examples of the data processing device can include not only computer systems, but also devices such as communication devices and personal devices (e.g., pagers, mobile phones, personal digital assistants, and electronic books, etc.) and other devices, such as the flow control devices described herein.

FIG. 1 and the following discussion are intended to provide a brief, general description of an exemplary data processing device adapted to implement the described embodiments. While embodiments will be described in the general context of instructions or code residing on hardware, e.g., within a storage or memory, those skilled in the art will recognize that embodiments may be implemented in a combination of program modules running in an operating system. Generally, program modules include routines, programs, components, and data structures, which perform particular tasks or implement particular abstract data types. The disclosure may also be practiced in other types of computing environments where tasks/functions are performed by remote processing devices that are linked through a communications network. In one or more computing environments, program modules may be located in both local and remote memory storage devices.

FIG. 1 illustrates an example data processing device 100 that comprises a processor integrated circuit (IC) chip 105 that includes thereon one or more processing units or microprocessor(s) 110. IC chip 105 is interchangeably referred to herein as processor chip 105 throughout the description herein. Also, the terms microprocessor(s) and processor can be utilized interchangeably as referring to the same component(s). Processor chip 105 further includes a memory device and/or persistent storage, generally represented by storage 115, which is coupled to microprocessor(s) 110 via a system interconnect. Processor chip 105 also comprises an external interconnect that enables connection to and communication with one or more external components to which the processor can be communicatively connected. As an example, Processor chip 105 is shown coupled via an input/output (I/O) controller 130 to input devices 132 and output devices 134 (collectively I/O devices 132/134). The one or more input/output (I/O) devices 132/134 of data processing device 100 are utilized to enable user interfacing with data processing device 100. I/O devices 132/134 are instrumental in providing the user interface functionality described herein. The I/O device(s) 132/134 enable both user input and output of results and data/information. Additionally, a third input signal 133 is shown, representing the flow signal being received by the data processing device 100, in one embodiment.

I/O controller 130 also enables connection to/with other removable storage device(s) 138 via respective device interface(s) 136. In a larger system, removable storage device 138 can be a computer readable storage device and can include solid state storage devices, optical drives, and other storage devices.

Storage 115 can be implemented via any one of a plurality of available storage devices, including flash storage and non-volatile random access memory (NVRAM) storage. As utilized herein, storage 115 refers to any device capable of holding and maintaining program code and data for later access thereto. Storage 115 maintains firmware 120, which according to one or more embodiments, generally comprises a plurality of program modules and program routines. Storage also comprises operating system (O/S) 127 and one or more applications 129. In at least one embodiment, storage 115 can also comprise a separate FFTC program module. However, for simplicity in describing the software enabled aspects of the disclosure, FFTC program module 125 is indicated as being a software coded module or utility (i.e., a functional set of program code) within firmware 120. Each functional module (firmware 120 and FFTC program module 125) comprises program code which provides specific functionality when the corresponding program code is executed by microprocessor 110 within data processing device 100 or within a larger system in which data processing device can be utilized, such as the below described system presented by FIG. 3. Specifically, FFTC program module 125 comprises code for completing the functions illustrated in the flow charts of FIGS. 5 and 6, and FFTC program module 125 can also include user interface modules for generating a plurality of user interfaces on a connected display screen. Functionally, FFTC program module 125 includes at least three different algorithms, each of which corresponds to use of a specific one of the calculation basis parameters. The algorithms provide separate analysis/calculations performed based on the selection of the specific calculation basis parameter. According to one or more embodiments, example algorithms for each of the calculation basis parameters can be presented via the following set of pseudo code:

```
*calculation basis param 1:
    [$use first calculation basis to perform calculation]
    [$output results as listing of parameters with parameter values
        influenced by use of first calculation basis]
    *Return
*calculation basis param 2:
    [$use second calculation basis to perform calculation]
    [$output results as listing of parameters with parameter values
        influenced by use of second calculation basis]
    *Return
*calculation basis param 3:
    [$use third calculation basis to perform calculation]
    [$output results as listing of parameters with parameter values
        influenced by use of third calculation basis]
    *Return
```

As a more specific example, the following variable can be defined in one embodiment:
totalFlow: expected flow for period
singlePulse: flow that single pulse represents
requestedVolume: volume to be collected
targetTrigger: user requested trigger if calculation basis is "Trigger"; calculated requested trigger otherwise
targetCount: user requested sample count if calculation basis is "Count"; calculated requested count otherwise
targetVolume: user requested sample volume if calculation basis is "Volume"; calculated requested volume otherwise
trueTrigger: final calculated trigger
trueCount: final calculated sample count
trueVolume: final calculated sample volume
With these variables defined, and ignoring error checking and rounding, the algorithm then provides the following general flow:
[$Determine calculation basis (i.e., one of "Trigger", "Count", or "Volume")]
[$Calculate remaining target variables (two of targetTrigger, targetCount, and targetVolume) for non-basis variables.]
    [$if targetTrigger is less than singlePulse, use singlePulse as trueTrigger]
    [otherwise, trueTrigger is targetTrigger rounded to nearest multiple of singlePulse]
[$trueCount is totalFlow/trueTrigger]
[$trueVolume is requestedVolume/trueCount]

Figure 2:
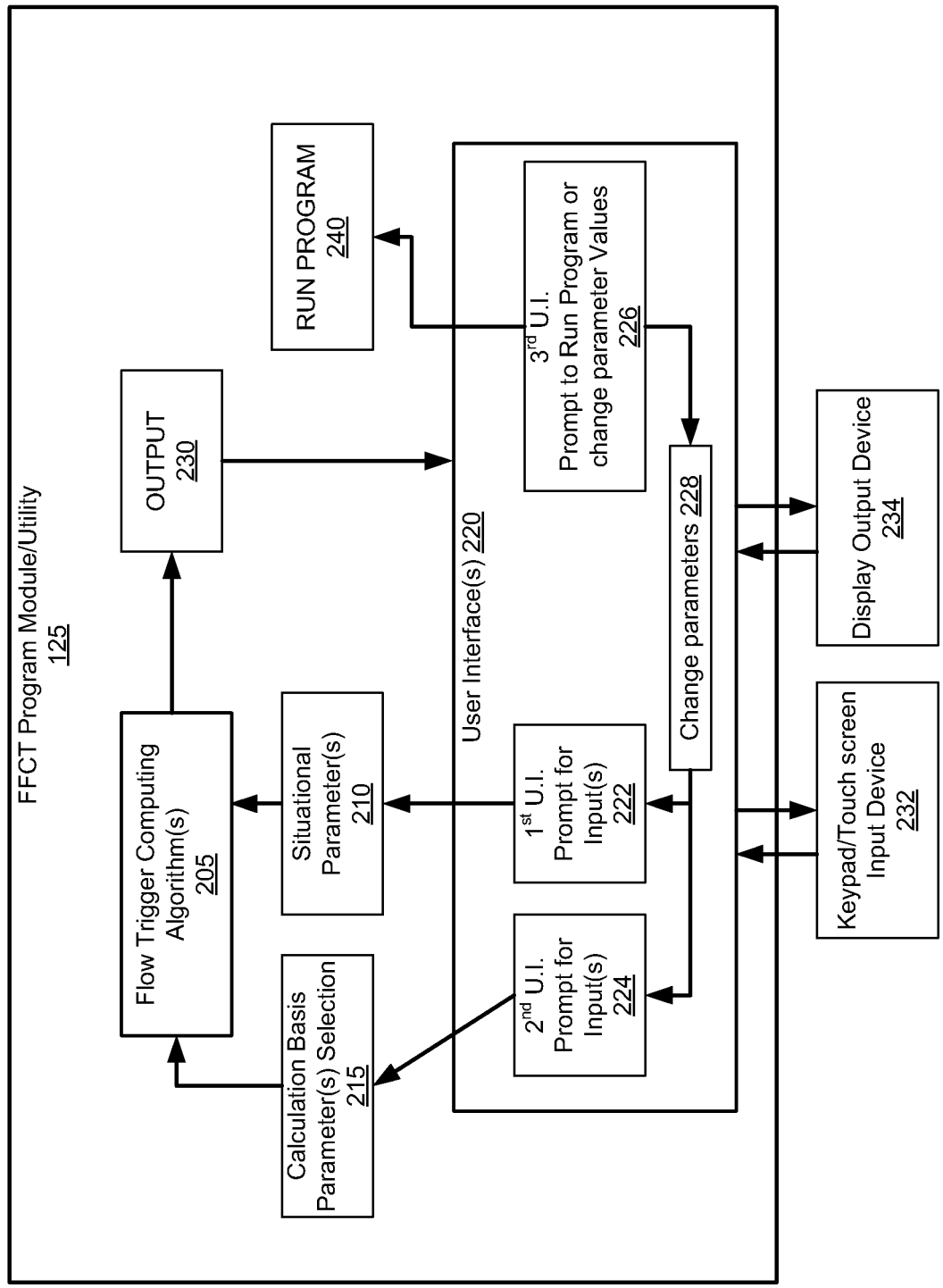
FIG. 2 provides a more detailed illustration of the functional components of a fluid flow trigger calculation (FFTC) program, according to one embodiment.

FIG. 2 illustrates a more detailed representation of FFTC program module 125, including functional components and connectivity to specific I/O devices. FFTC program module 125 includes a flow trigger computing algorithm 205, which receives inputs of both situational parameters 210 and user-selectable calculation basis parameters 215. FFTC program module 125 also comprises a plurality of user interfaces 220, which are visually displayed on a connected display output device 234. User Interface(s) 220 includes first user interface 222 utilized for displaying the situational parameters 210 and entry of specific values for selected situational parameters 210. First user interface 222 provides a prompt and/or displays selectable options requesting user input or user selection of the situational parameters. In one embodiment, the user selects which situational parameters are applicable to the event being monitored, and the user may also select specific situational parameter values for these situational parameters via entry or selection within first user interface 222. In an alternate embodiment, the situational parameters and associated values can be retrieved from storage and applied without user entry or selection thereof. Interface(s) 220 also includes second user interface 224 within which a prompt is provided/displayed requesting user input or user selection of the calculation basis parameter. The second user interface 224 can, in one embodiment, provide a list of each of the available calculation basis parameters 215 along with a scrolling mechanism and/or other affordance that can be manipulated by use of a keypad or touch screen input device 232 in order to complete a selection of one (or more) of the calculation basis parameters 215. A similar entry mechanism can also be provided within both first and second user interface(s) 222/224 Flow trigger computing algorithm 205 utilizes the received inputs to generate an output result 230, illustrated and described by FIG. 4C. The generated output results 230 are displayed within a third user interface 226.

As described herein, one aspect of FFTC program module 125 is the generation of a result output 230, which is outputted via third user interface 226. The generated result output 230 includes parameter values corresponding to the situational parameters and the selected calculation basis parameters, as well as a list of parameters related to the flow trigger control and associated precise and best fit calculated values. As shown, third user interface 226 provides or displays a set of prompts or selectable options, requesting that the user either (1) run the program using the calculated best fit results or (2) provide an input to modify one or more of the outputted list of parameters. According to the illustrative embodiment, selection by the user of the second option or prompt and entry of new parameter values results in change parameters 228 being propagated through first user interface 222 and/or second user interface 224, changing the values or selections of at least one of a situational parameter and/or changing a selection of the calculation basis and/or CBP value. According to one aspect of the disclosure, received input at second user interface 224 can be a selection of a specific calculation basis parameter and/or entry of a request to begin flow trigger evaluation following the selection. The received input of the calculation basis parameter is then passed to flow trigger computing algorithms 205 as a start trigger.

Figure 3:
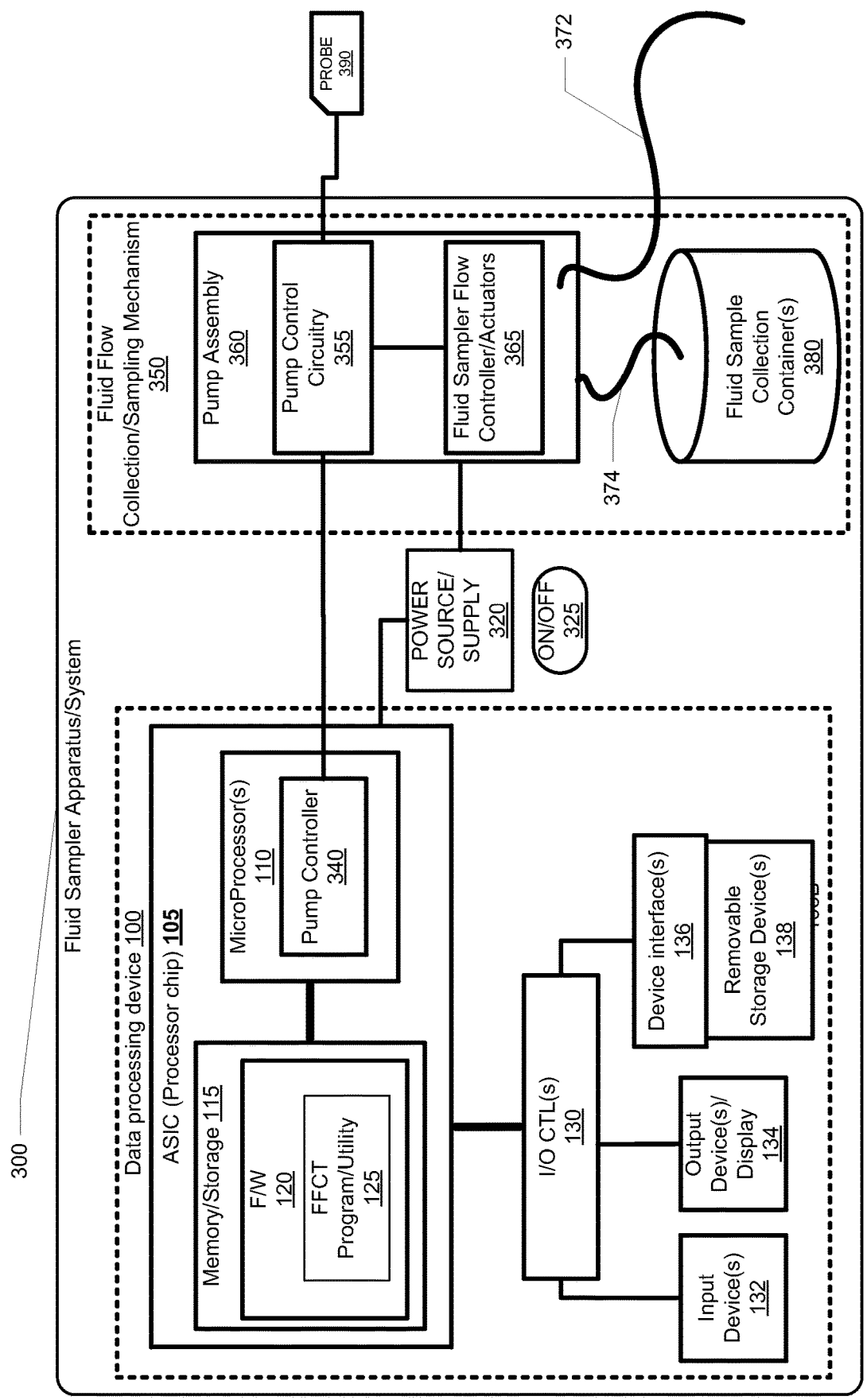
FIG. 3 illustrates a block diagram representation of an example fluid sampler (or sampling mechanism) within which the data processing device of FIG. 1 can be advantageously utilized, in accordance with one or more embodiments.

Referring now to FIG. 3, there is illustrated an example fluid sampling apparatus (or fluid sampler) 300. Fluid sampler 300 includes processing components, made up of microprocessor 110 and memory/storage 115, in communication with other physical components that enable fluid sampling and user manipulation of the device in order to initiate fluid sampling and generate specific desired results when FFTC program 125 is executed thereon. As provided by FIG. 3, the microprocessor 110 and memory 115 can be provided on processor chip 105, located within a processing device 100 similar to the configuration of data processing device 100 of FIG. 1. Fluid sampler 300 includes input/output (I/O) devices 132/134, which can be separate input devices (e.g., keypad and/or keyboard) and output devices (e.g., display monitor) or a combined I/O device, such as a touch screen display. The I/O devices are communicatively connected to processor 100. The functionality of these I/O devices 210 are introduced above in FIG. 1 description and further described herein within the descriptions about the user interface features of the disclosure.

The functionality of most of these components have been described in detail with respect to FIGS. 1 and 2 and as such will not be described again. Additionally, however, fluid sampler 300 also comprises additional functional components to control the monitoring of a fluid event and control and complete the intake of fluid samples. Thus, as shown, processor chip 105 includes fluid flow collection/sampling mechanism 350, which is communicatively coupled to pump controller 340 within microprocessor 110. As utilized herein, pump controller 340 is simply representative of either a hardware device and/or a firmware executing on microprocessor 110 than receives inputs from microprocessor and transmits control signals to a corresponding pump control circuitry 355 of fluid flow collection/sampling mechanism 350.

Collection mechanism 350 comprises a pumping assembly 360, which includes pump control circuitry 355, and flow controller/actuators 365. Coupled to the pumping assembly 360 are intake tubing 372 and collection tubing 374. Collection mechanism 350 also comprises at least one collection container(s) 380 in which an end of collection tubing 374 is directed. Collection container(s) 380 have a specific maximum volume capacity for holding collected fluid samples. In one or more embodiments, multiple collection containers can be provided for collection of different samples. When a single collection container is utilized, all samples are collected into the container as a composite sample. Pump assembly 360 operates in tandem with external tubing 372 and internal tubing 374 to pull sample fluid from the fluid flow ?event? and deposit the sample fluid into collection container(s) 380. According to one aspect of the disclosure, microprocessor 110 is integrated into and controls the operation of pump assembly 360, via pump controller 340, in one embodiment, based on the result received from execution of FFTC program 125 with certain inputs of situational parameters and/or selections related to the calculation basis parameters and values thereof. Thus, in one or more embodiments, microprocessor 110 operates as the controller for pump assembly 360 and controls when the pump turns on to collect a fluid sample and for how long the pump remains operational during each sample collection cycle. Alternate embodiments can provide a separate pump controller, which can be located within pump assembly 360 as part of pump control circuitry 355, that receives input from microprocessor 110 and then controls the operation of pump assembly 360 based on the received inputs. The internal processing circuitry of pump assembly 360 and/or collection mechanism 350 can vary from one implementation to the other, and the described operations are not intended to imply any limitations on the type of pump or collection mechanism utilized to perform the actual collection of the fluid samples.

Fluid sampler 300 also includes a power source 320 and a power on/off button 325. This power source 320 can be AC power and/or a battery and/or solar panel to enable the fluid sampler 300 to operate without any external power connectors/cables. Power is distributed via a power distribution system (not shown) to the various components requiring power for operation.

According to one embodiment, communicatively connected to fluid sampler 200 is a probe 390, which is utilized to monitor the flow of the fluid being sampled. Probe 390 detects the amount of fluid flow per period of time, and can also provide feedback of the events being monitored. In at least one implementation, certain of the functionality described as being performed by data processing device 100 and/or the actual data processing device 100 can be implemented within probe 390.

The above presentation of FIGS. 1 and 3 represent two alternate embodiments of an apparatus for controlling sampling of an event involving a fluid flow. As with the above descriptions, the apparatus comprises a microprocessor 110 and a storage device 115 communicatively coupled to the processor. The storage device includes firmware 120 having executable code that is executed by the processor 110 to cause the apparatus to perform various functions related to controlling the sampling of the fluid flow. Thus, when executed, the firmware 120 causes the apparatus to receive an input selection of at least one calculation basis parameter among multiple selectable calculation basis parameters. The apparatus then performs a computation that calculates a result containing one or more values corresponding to a flow trigger based on the selected at least one calculation basis parameter and a plurality of situational parameters. With the result obtained (and approved by the person setting up the fluid sampler), the apparatus triggers the collection mechanism, that is communicatively coupled to the processor, to initiate collection of samples of the fluid flow based on the determined one or more values corresponding to the flow trigger. Notably, in an embodiment in which the result is calculated within a data processing device that is separate from and not communicatively connected to the fluid sampler, the result can be manually entered into the fluid sampler and the fluid sampler then triggers the collection mechanism to initiate the collection of the samples. Thus, with this alternate implementation, the collection mechanism is a component of a sampling mechanism and the apparatus is a separate device from the sampling mechanism. The sampling mechanism includes the collection mechanism that is programmable to collect one or more samples of the fluid flow.

According to one embodiment, the firmware code, which causes the apparatus to perform the computation and/or calculation of the result, comprises code for a fluid flow trigger calculation (FFTC) program 125. The firmware then causes the apparatus to execute the FFTC program 125 to compute the flow trigger based on an analysis of (a) one or more situational parameters and (b) at least one selectable calculation basis parameter, which is selected as a basis for the computation from among a plurality of selectable calculation basis parameters. The FFTC program 125 computes a best flow trigger represented by the result whose values are calculated based on the selected calculation basis parameters and values of the situational parameters.

In the discussion of the following figures, reference is also made to elements described in FIGS. 1, 2, and 3. Those of ordinary skill in the art will appreciate that the hardware components and basic configuration depicted in FIGS. 1 and 2 and described herein may vary. For example, the illustrative components within fluid sampler 300 are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 4B:
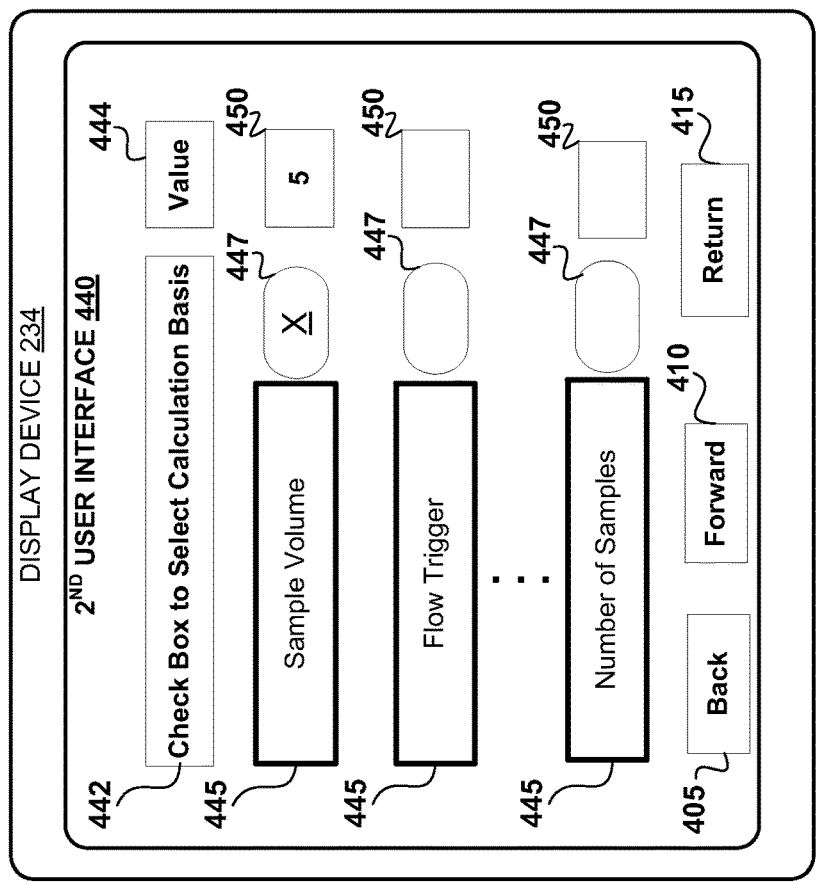
FIGS. 4A-4B illustrates a sequence of input user interfaces generated by execution of input/output code segments of the FFTC program within a processing device such as the processing devices of FIGS. 1 and 3, in accordance with one or more embodiments.
Figure 4A:
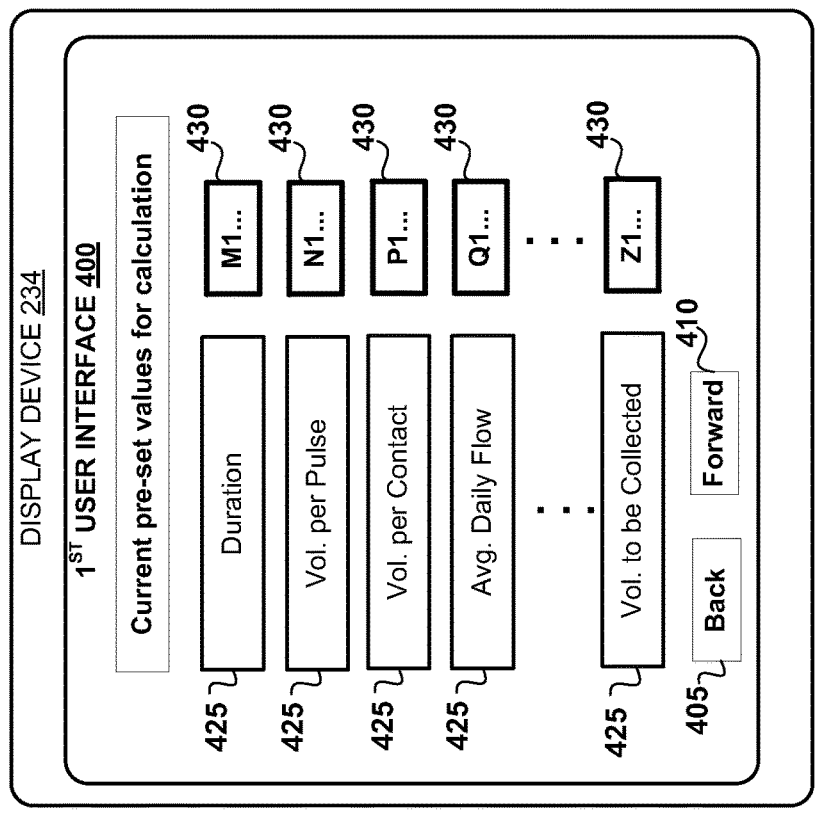
Figure 4C:
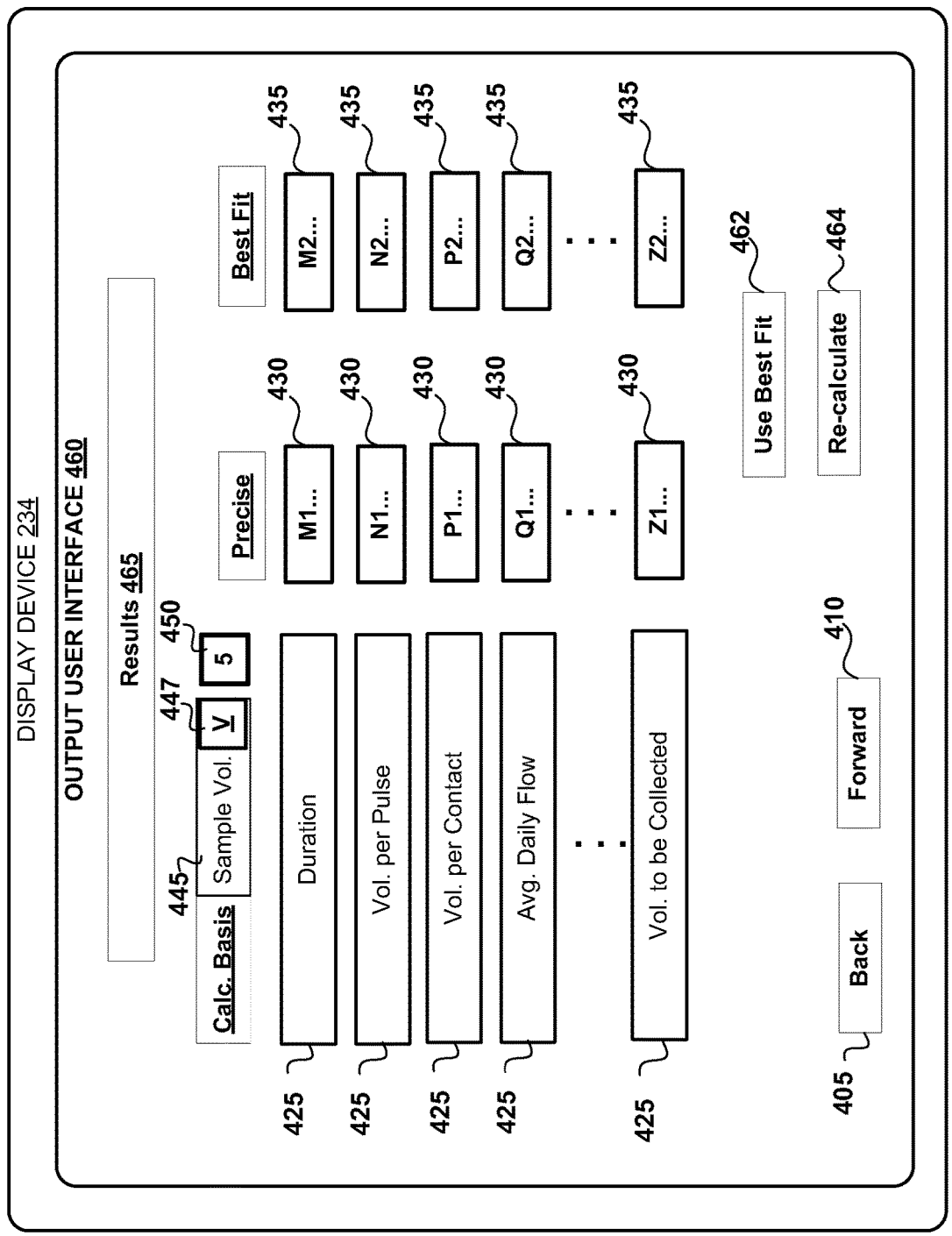
FIG. 4C illustrates an example output of results including a listing of parameters with both precise and best fit calculated values, in accordance with one or more embodiments.

With reference now to FIGS. 4A-4C, there are illustrated various embodiments of user interfaces 400, 440, 460 presented on example display device 234 (of FIGS. 1, 2, and 3), which is communicatively connected to processor 110. According to one or more embodiment, the display device 234 is associated with the apparatus represented by one or both of FIGS. 1 and 2. As presented within the description of FIGS. 1 and 2, the apparatus comprises an input device for entry of the one or more input selections and parameter values and an output device for outputting the result and displaying one or more user interfaces.

Generally, the inputs to FFTC Module 125 are received through a series of user interfaces, which are collectively represented as first user interface 400 and second user interface 440. First user interface 400 enables user entry and/or selection of situational parameters of relevance to the particular implementation, while second user interface 440 enables user selection of a specific calculation basis parameter and corresponding value for use in biasing the calculations performed by FFTC Module 125 to provide specific set of outputs.

Referring specifically to the figures, FIG. 4A presents first user interface 400 in which one or more of the situational parameters 425 are presented, along with the selected parameter values 430, according to one embodiment. As utilized herein, the term situational parameters refer to specific parameters that are based on factors over which the user (of the fluid sampler) may not have any control or are not typically changed. As presented herein, the situational parameters 425 include but are not limited to duration, volume per pulse, volume per contact, average daily flow, and volume to be collected. During implementation, the situational parameters 425 can include at least one parameter from among this list of parameters. In one embodiment, the user can adjust the value 430 of one or more of the situational parameters 425 within first user interface 400. As one specific example, the data entry within first user interface 400 can include start time, duration, and average daily flow. The duration can be presented by a time value, such as hours or days, for example, while the average daily flow can be provided in a unit of volume per time (e.g., gallons per day). The average daily flow can represent the amount of flow that is predicted will occur in a next 24 hour period. Specifically, the average daily flow can be a user input or recorded from the previous time period as a predictor of what the total flow will be in the next time period. The average daily flow is then utilized as a parameter in the calculation, and the taking of samples is done based on the trigger that is calculated (or inputted). During implementation, the FFTC module 125 utilizes the resultant values to trigger a sample to be taken after every 30 gallons of fluid flow that is recorded. Additionally, in one embodiment, FFTC module 125 allows for a time-triggered override of the flow trigger or flow interval (e.g., the number of gallons, X, that should flow past the monitor before a sample is taken). This override can be performed in situations in which the X gallons of fluid flow is not recorded within a specific amount of time (e.g., 6 hours) from when the previous sample was taken or from when the sampling was initiated. It is appreciated that the variable X can be any integer or real number value, e.g., 30. Also, the failure to take a sample after a specific time can be due to one or more conditions that affect the fluid flow or measurement thereof. The time override enables the sample to be taken even though the specified situational parameter, such as the amount of fluid flow measured has not reached the pre-set parameter value (which, in this example, is 30 gallons).

FIG. 4B presents second user interface 440 in which a prompt 442 is presented along with a listing of calculation basis parameters 445 for user selection thereof via corresponding selection boxes 447. Also shown are entry boxes for entry of a corresponding calculation basis parameter value 450 of the selected calculation basis parameter 445. As utilized herein, the term calculation basis parameter refers to the at least one parameter that is utilized as the focal point around which the FFTC program calculates a result that corresponds to the flow trigger utilized to control how the fluid samples are ultimately collected. As presented in the illustrative embodiment, the calculation basis parameters 455 can include, but are not limited to, sample volume, flow trigger, and number of samples. In this embodiment, flow trigger refers to a tracking and utilization of the gallons gone by to determine when to take a next sample (e.g., every 50,000 gallons).

The firmware code (corresponding to FFTC module) of the apparatus further comprises code that when executed by the processor causes the apparatus to: display a user interface, e.g., second user interface 440, having one or more areas for receipt of the at least one input selection (see selection/value boxes 447 next to each calculation basis parameter 445, an entry box for corresponding calculation basis parameter value 445, and return button/affordance 415). The firmware code identifies within the user interface 440 which selectable calculation basis parameters 445 can be selected via the user interface 440. And the firmware also enables the apparatus to enable toggling (e.g., via back button 405 or next/forward button 410) between the user interface 440 displaying the calculation basis parameters 405 and at least one additional user interface, first user interface 400, displaying at least one situational parameter along with an initial value assigned to the situational parameter. The initial value can be changed by entry of a different value via the additional user interface (400). In one embodiment, the firmware code provides a prompt 442 within the user interface 440 for selection/value of one of the calculation basis parameters 445 for use in performing the calculation of the flow trigger. According to one implementation, in response to not receiving a selection of a calculation basis parameter 445 within a pre-established time-out period, the firmware code returns the display to a home screen display interface (not shown).

A user is required to select at least one of these calculation basis parameters 445 to trigger the specific type of calculation and/or analysis performed by the FFTC program. According to one aspect of the disclosure, the processor executes the FFTC program to perform at least three different types of computation, based on which one of the calculation basis parameters is selected as the trigger for the FFTC program to perform the calculation. According to one or more embodiments, the firmware code that causes the apparatus to perform the calculation comprises code for calculating a best flow trigger to obtain results that correlate to the at least one input selection of a calculation basis parameter and values specified for the situational parameters utilized.

FIG. 4C presents a third user interface, output user interface 460, which provides an example output results 415, which includes a list of parameters with two corresponding sets of result values. The firmware code of the apparatus comprises code that causes the apparatus to output the result(s) 465 as a listing of parameters, including the selected calculation basis parameter 445 and result parameters, which are illustrated as being synonymous with the situational parameters 425 and are this described using the same reference numeral. Results 465 include both precise parameter values 430 of the result parameters 425 and best fit calculated parameter values 435 of the results parameters 425. The best fit calculated parameter values 435 comprise a series of altered situation-specific or application-specific values associated with the result 465 that indicate actual values of the result parameters 425 that will result from or be utilized during sample collection. The set of precise calculated values 430 is raw, unfitted parameter values that do not consider the particular usage of the values, while the set of best fit calculated values 435 are based on the specific situation/application which is being triggered. The results 465, including the listing of results parameters 425 and corresponding values 430, 435 are generated by processor execution of the FFTC module 125, with inputs being the received situational parameter and situational parameter values and at least one selected calculation basis parameter 445 and corresponding calculation basis parameter value 450. According to one aspect of the disclosure, the listing of parameters can comprise a plurality of parameters including trigger in gallons, trigger in pulses/contact closures, duration, number of samples, total volume to be collected, interval between samples, sample volume. Several of these are represented within output user interface 460.

The list of results 465 provides information about many factors for the program run. Best fit parameters are provided as optional parameters that can be selected by the user to run the program. All result values are considered informational and the user interface permits the user to evaluate the different sets of values and alter or modify specific values if the current values are not what the user actually wants. The disclosure appreciates and accounts for the fact that the precise calculated values of the results parameters may not be exactly what was requested, and thus the FFTC program module 125 automatically generates a best fit output as well. Thus, for example, if 1000 gallons per pulse is utilized during the sampling, the precise calculated value may be 750 gallons per pulse, and as such the calculated value cannot be utilized as a trigger within the flow sampling program run.

Output user interface 460 also includes several selectable functional affordances, including calculation basis selector 447, "use best fit" values selector 462, and re-calculate selector 464. The firmware code that generates output user interface 460 enables (1) user re-selection of at least one parameter value 430 for one or more of the situational parameters 425 to an updated parameter value; and (2) user selection of a different calculation basis parameters 445 and/or change of a corresponding calculation basis parameter value 450 via an associated selection affordance 447. According to one implementation, a user is able to view each of the available calculation basis parameters 445 in a drop down menu/list that opens up on selection of selection affordance 447. Additionally, in response to a first input selection indicating acceptance of the outputted result (i.e., selection of "use best fit" values selector 462 to trigger sampling utilizing the best fit calculated values 435), the firmware code causes the apparatus to trigger the sampling mechanism to perform collection of samples based on the outputted result.

Also, in response to a modification of at least one parameter value utilized in generating the result, the firmware enables the apparatus to perform a new calculation to generate a new result utilizing the FFTC program. In one embodiment, this re-calculation is triggered based on a detected selection of the re-calculate selector 464. The new result is generated with result parameters and parameter values that account for the modification of one or more of the parameter values or selection of a different calculation basis parameter. Accordingly, the modification comprises receipt of one or more of (a) a selection of at least one different calculation basis parameter, (b) entry of a new value for at least one situational parameter utilized in generating the result, and (c) entry of a new value for one of the results parameters.

According to one embodiment, the firmware code further comprises code that when executed by the processor enables the apparatus to receive event data indicating one or more flow conditions of a fluid flow monitored over at least one timeframe. In one implementation, the event data is received from a flow sensor (e.g., 190) associated with a sampling mechanism (e.g., 300). Also, in response to receiving the event data, the firmware causes the apparatus to autonomously modify one or more situational parameters, by re-calculating the values of the one or more situational parameters, based on the event data received, to generate updated values. The apparatus then stores the updated values in a storage device that is communicatively coupled to the processor, and the updated values are thus accessible for use during subsequent sampling runs. Accordingly, for at least one subsequent sampling run over a second timeframe, the apparatus performs the calculation to determine the flow trigger utilizing the updated values of the situational parameters.

Figure 5:
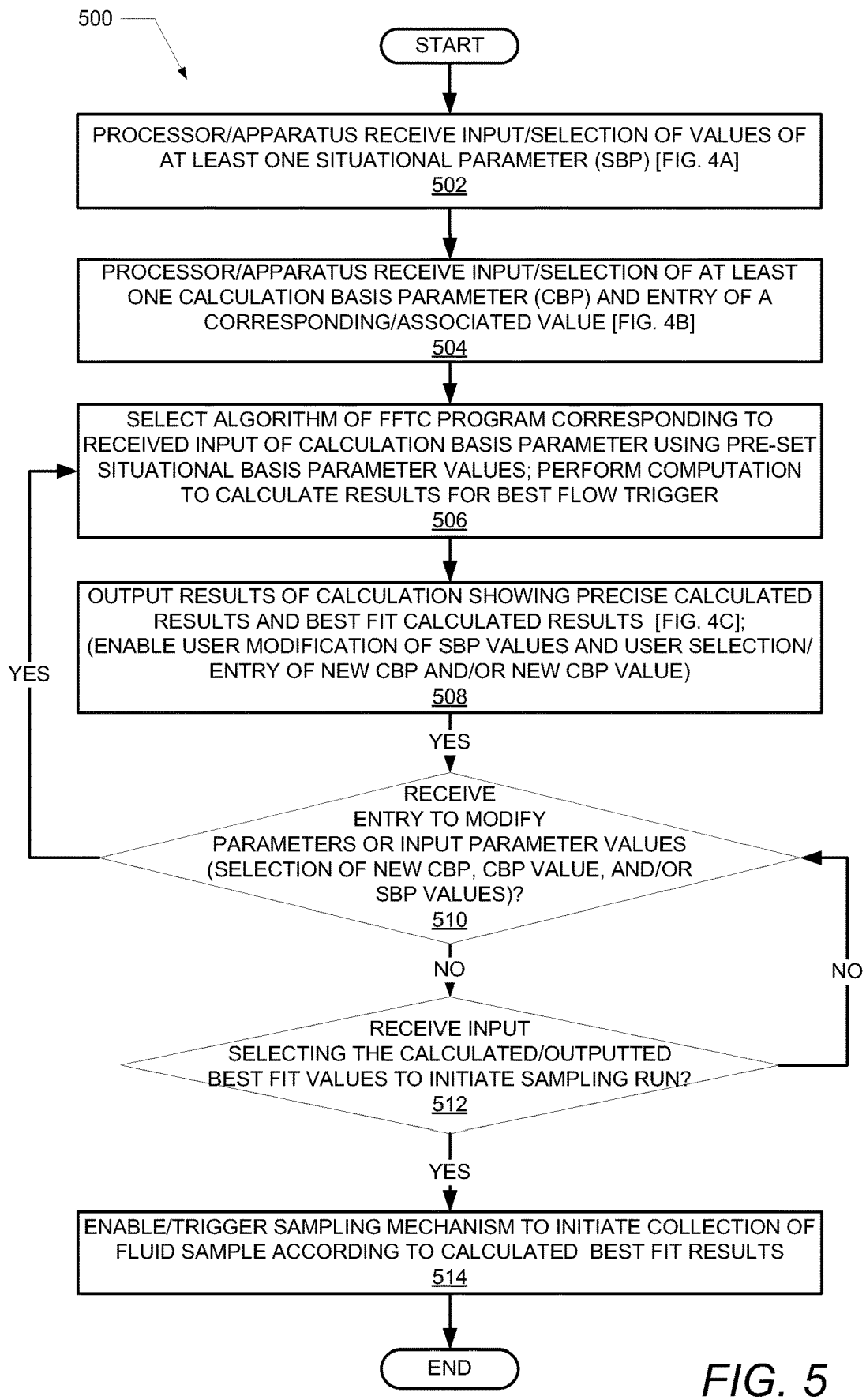
FIG. 5 is a flow chart illustrating one example of a method for performing the calculation of a flow trigger and associated processes, according to one or more embodiments.
Figure 6:
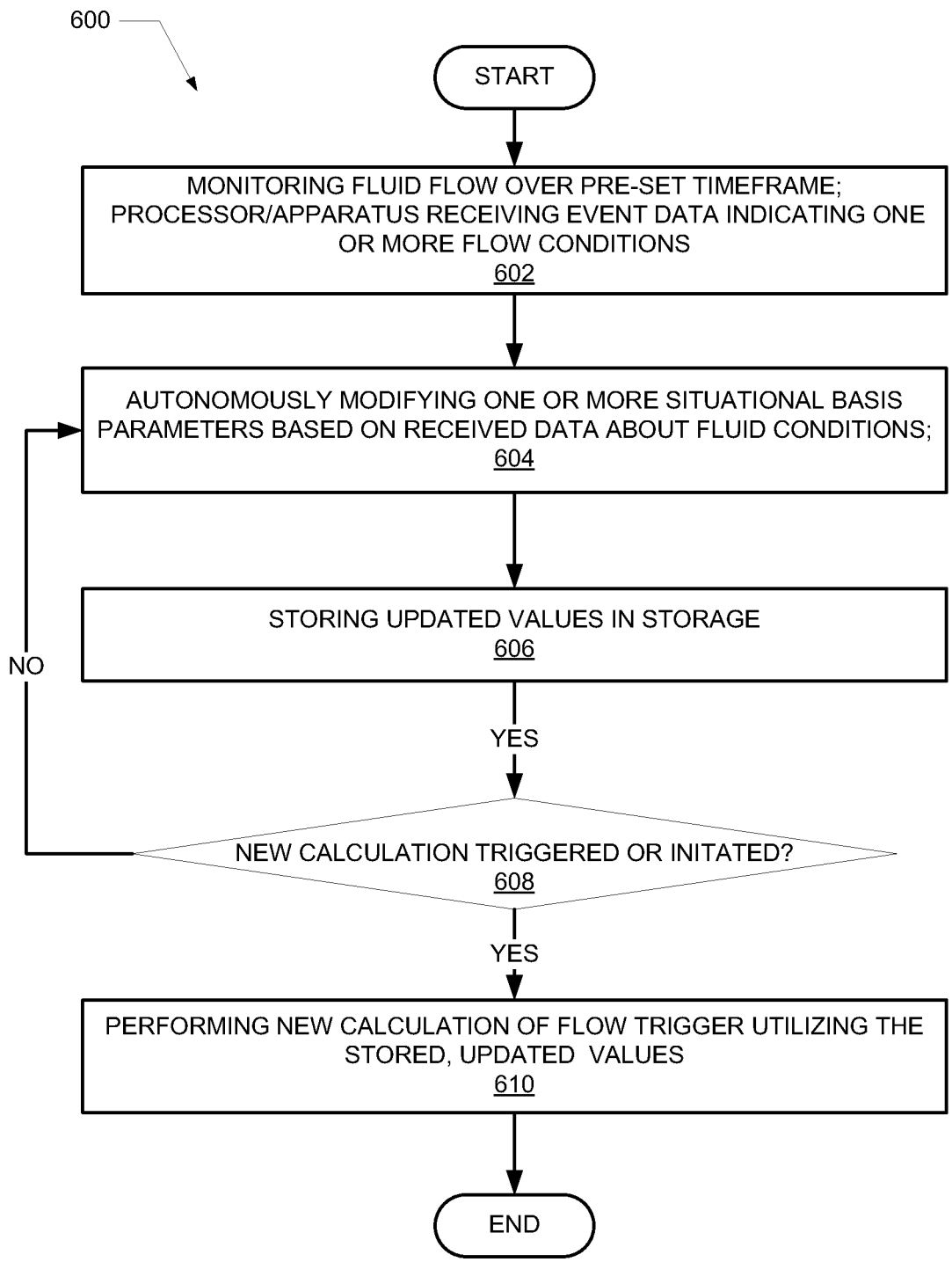
FIG. 6 is a flow chart illustrating one example of a method for updating and/or modifying parameter values utilized during calculation of a flow trigger, according to one or more embodiments.
Figure 7:
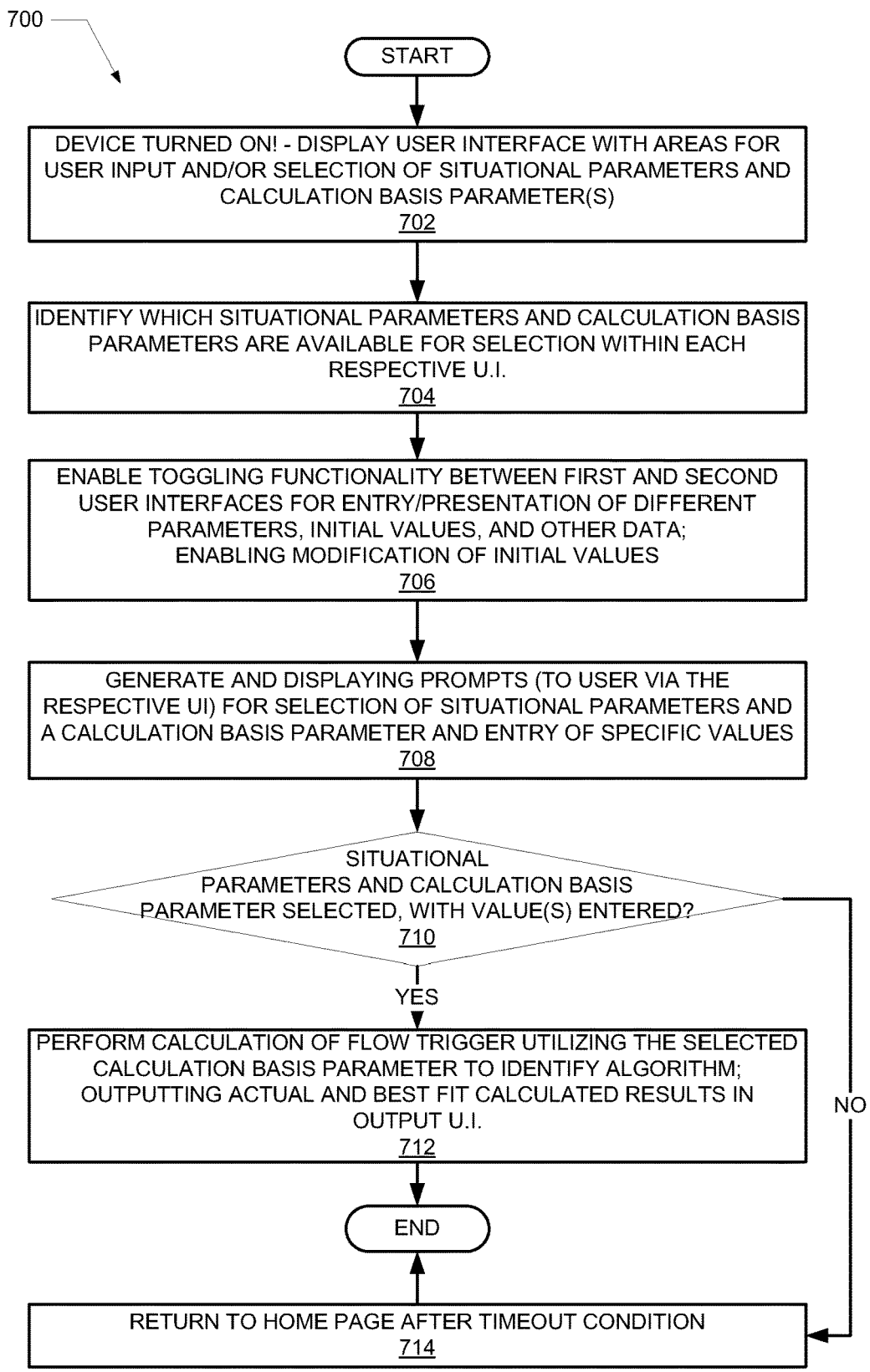
FIG. 7 is a flow chart illustrating one example of a method for updating and/or modifying parameter values utilized during calculation of a flow trigger, according to one or more embodiments.

FIGS. 5-7 are flowcharts illustrating various processor-implemented methods for controlling the sampling of an event involving a fluid flow. The processor-implemented methods can also be interchangeably referred to as computer-implemented methods, which indicate the use of a computer device to complete the operations enabled by processor execution of the program code. Computer-implemented methods 500, 600, and/or 700 can be implemented in data processing device 100 and/or in fluid sampler 200 via execution of FFTC program 125. In the description of FIG. 5, reference is also made to components illustrated within FIGS. 1-4, which components have been introduced in the previous description of those figures. Generally the methods 500, 600, and/or 700 are described as being implemented via processor execution of code provided by firmware and specifically code segments or modules of FFTC program 125 illustrated within FIG. 2 and also represented by the example algorithms presented above. It is however appreciated that certain aspects of the described methods 500, 600, and/or 700 may be implemented via other processing devices and/or execution of other code.

Referring to FIG. 5, computer-implemented method 500 begins at start block and proceeds to block 502 at which the processor or apparatus receives an input selection of at least one situational parameter and associated situational parameter value. At block 504, the processor or apparatus receives (a) an input selection of at least one calculation basis parameter among multiple selectable calculation basis parameters and (b) entry of an associated calculation basis parameter value. At block 506, the processor selects the specific FFTC program module or subroutine corresponding to the received calculation basis parameter, and the processor performs a computation that calculates a result containing one or more values corresponding to a flow trigger based on the selected at least one calculation basis parameter and the associated calculation basis parameter value and a plurality of situational parameters and values. As described above, in one or more embodiments, performing a computation that calculates the result includes executing a fluid flow trigger calculation (FFTC) program that computes the flow trigger based on an analysis of (a) one or more situational parameters and (b) at least one selectable calculation basis parameter, which is selected as a basis for the computation from among a plurality of selectable calculation basis parameters. According to one embodiment, the FFTC program computes a best flow trigger represented by the result whose values are calculated based on the selected calculation basis parameter and values of the selected calculation basis parameter and of the situational parameters.

Once the FTC program completes the computation, the method 500 further includes the processor outputting the result as a listing of parameters with both precise calculated parameter values of the result parameters and best fit calculated parameter values of the situational parameters (block 506). The best fit calculated values comprise a series of situation-specific or application-specific values associated with the application or situation corresponding to the even that is being monitored and indicate actual values of the result parameters that will be implemented with the flow trigger calculated. Method 500 further provides enabling user modification of at least one the precise calculated parameter value or one best fit calculated parameter value to an updated parameter value for one or more of the result parameters and/or enabling user selection of a different calculation basis parameter or the situational parameters and parameter values. Specifically, method 500 determines at block 508 whether one or more modifications are received to one or more components (i.e., results parameters values, calculation basis parameter, situational parameter or parameter values) as entries in the output user interface. Then, in response to receipt of a modification of at least one parameter component utilized in generating the result, method 500 returns to block 504, and includes performing a new calculation to generate a new result utilizing the FFTC program module 125 with parameters and parameter values that account for the modification. The new result is then outputted similarly to the output of the first/previous result (block 506).

Assuming no additional modifications are received, method 500 proceeds to decision block 510, at which method 500 determines whether a first input selection is received indicating acceptance of the outputted result (i.e., utilizing the best fit calculated parameter values for the results parameters to initiate and perform or control the sampling). In response to a first input selection indicating acceptance of the outputted result, method 500 includes triggering or enabling the sampling mechanism to initiate and perform collection of samples of the fluid flow based on the determined one or more values corresponding to the flow trigger, represented by the outputted result (block 512). In one embodiment, the triggering or enabling can be performed by the processor. However, alternate embodiments allow for remote triggers and/or manual triggers. As one example, a smart phone user can be provided with the results and be permitted to remotely enable the sampling mechanism to initiate sample collection.

Referring now to FIG. 6, which is a flow chart illustrating the method 600 by which situational parameters are autonomously updated based on monitored and/or detected events. Method 600 begins at start block and proceeds to block 602 where method provides receiving event data indicating one or more flow conditions of a fluid flow monitored over at least one timeframe. The event data is received from a flow sensor associated with the sampling mechanism and the time frame is pre-established for one or more previous sampling runs. At block 604, in response to receiving the event data, method 600 provides autonomously modifying one or more situational parameters, by re-calculating the values of the one or more situational parameters based on the event data received to generate updated values. Method 600 further includes storing the updated values in a storage device communicatively coupled to the processor (block 606). The updated values are then accessible for use during subsequent sampling runs. At decision block 608, method 600 includes determining whether a new/next sampling run or a new/next calculation has been triggered. And, in response to the new calculation being triggered, method 600 includes performing the new/next calculation to determine the flow trigger, utilizing the updated values of the situational parameters, in at least one subsequent sampling run over a second timeframe. However, when no new calculation is triggered, method 600 iterates back to block 604.

FIG. 7 presents a flow chart of the method 700 by which the user interfaces 400, 420, 450 of FIG. 4 are utilized to enable user interfacing for input selections and output of information related to the functions associated with method 500. Method 700 begins at start block and can be initiated by the fluid sampler or data processing device being initially turned on and/or detecting initiation of the execution of the FFTC program on the particular device. At block 702, method 700 provides displaying, on a display device that is communicatively connected to the processor, a user interface having one or more areas for receipt of the at least one input selection. Method 700 further provides (at block 704) identifying within the user interface which of a plurality of selectable calculation basis parameters can be selected via the user interface. At block 706, method 700 further includes enabling toggling between the user interface displaying the calculation basis parameters and at least one additional user interface displaying at least one situational parameter along with an initial value assigned to the situational parameter. Accordingly, the initial value can be changed by entry of a different value via the additional user interface. Also, at block 708, method includes providing a prompt within the user interface for selection of one of the calculation basis parameters for use in performing the calculation of the flow trigger. At decision block 710, method 700 includes determining whether a selection of the calculation basis parameter has been detected. In response to detection of a selection of a specific calculation basis parameter, method 700 includes performing the calculation of the flow trigger and outputting the results via the output user interface 450 (block 712). However, if no selection is detected, then, at block 714, method 700 includes returning to a home screen display interface, in response to not receiving a selection of a calculation basis parameter within a pre-established time-out period. According to one embodiment, the calculation basis parameters comprise at least one of sample volume, flow trigger, and number of samples, and the situational parameters comprise at least one of duration, volume per pulse, volume per contact, average daily flow, and volume to be collected. Further, the performing a calculation comprises calculating a best flow trigger to obtain results that correlate to the at least one input selection of a calculation basis parameter and initial values specified for the situational parameters utilized.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present disclosure may be implemented using any combination of software, firmware or hardware. As a preparatory step to practicing the disclosure in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the disclosure. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

Thus, it is important that while an illustrative embodiment of the present disclosure is described in the context of a fully functional computer (server) system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A processor-implemented method of controlling sampling of an event involving a fluid flow, the method comprising:

receiving, within a first user interface (GUI) via an input device of a data processing device, a selection of one or more situational parameters for utilization in a flow sampling event being programmed, the one or more situational parameters comprising at least one of duration, volume per pulse, volume per contact, average daily flow, and volume to be collected;

updating, via a processor of the data processing device executing a fluid flow trigger calculation (FFTC) program, a value associated with a selected situational parameter in response to receiving an entry of one or more situational parameter values of the selected situational parameter;

receiving an input selection of at least one calculation basis parameter (CBP) from among multiple selectable calculation basis parameters presented on a user interface associated with the data processing device, the selected at least one CBP comprising at least one of sample volume, flow trigger, and number of samples;

receiving an entry of a corresponding CBP value of the selected at least one CBP;

the processor calculating a first result containing one or more values corresponding to a flow trigger based on the selected at least one CBP and the corresponding CBP value entered and situational parameter values of the one or more situational parameters, wherein the selected at least one CBP is utilized as a focal point around which the FFTC program calculates the first result that corresponds to the flow trigger, which is utilized to control how fluid samples are collected;

the processor calculating a best flow trigger represented by second results that correlate to the at least one input selection of the at least one CBP and corresponding CBP value entered and the situational parameters utilized in the calculation calculating of the first result;

outputting the second results on a display device as a listing of result parameters with two sets of calculated values including a first set of raw, unfitted parameter values of the calculation and a second set of best fit parameter values, wherein the best fit parameter values comprise a series of situation-specific values that indicate actual values of the result parameters that will be implemented with activation of the FFTC program;

enabling user modification of a parameter value of at least one of the result parameters to an updated parameter value for one or more of the situational parameters and the calculation basis parameter to be used in a recalculation, based on a user determination of whether or not the second results that are calculated and outputted are acceptable; and the processor triggering a sampling mechanism to initiate collection of samples of the fluid flow based on the second results corresponding to the calculated best flow trigger, the collection performed by the sampling mechanism communicatively coupled to and controlled by the processor.

2. The processor-implemented method of claim 1, wherein receiving one or more situational parameters further comprises one or more of: (a) displaying, on a display device associated with the data processing device, available situational parameters for selection and receiving an input of a corresponding parameter value to assign to each of the selected one or more situational parameters and (b) selecting at least one previously determined situational parameter, which includes a corresponding pre-stored parameter value assigned to the at least one previously determined situational parameter.

3. The processor-implemented method of claim 1, wherein calculating the result comprises:

executing the FFTC program that computes the flow trigger based on an evaluation including (a) the selected one or more situational parameters and (b) the selected at least one calculation basis parameter;

wherein the FFTC program computes a best flow trigger represented by a calculated best fit result whose values are calculated based on the selected calculation basis parameter and values of the selected one or more situational parameters.

4. The processor-implemented method of claim 1, further comprising:
enabling user selection of a different CBP and entry of a corresponding new CBP value;
in response to a first input selection indicating acceptance of the outputted second results, triggering the sampling mechanism to perform collection of samples based on the best fit result parameter values within the outputted second results; and
in response to receiving a modification of at least one component utilized in generating the result, performing a new calculation to generate a new result utilizing the FFTC program with parameters and parameter values that account for the modification.

5. The processor-implemented method of claim 4, wherein:
the raw, unfitted parameter values are actual precise calculated values; and
the listing of result parameters comprises a plurality of parameters from among a trigger in gallons, trigger in pulses, duration, number of samples, total volume to be collected, interval between samples, and sample volume.

6. The processor-implemented method of claim 1, further comprising:
receiving event data indicating one or more flow conditions of a fluid flow monitored over at least one timeframe, wherein the event data is received from a flow sensor associated with the sampling mechanism;
in response to receiving the event data, autonomously modifying one or more situational parameters by re-calculating the values of the one or more situational parameters based on the event data received to generate updated values;
storing the updated values in a storage device communicatively coupled to the processor, wherein the updated values are accessible for use during subsequent sampling runs; and
performing the calculation to determine the flow trigger in at least one subsequent sampling run over a second timeframe utilizing the updated values of the situational parameters.

7. The processor-implemented method of claim 1, further comprising:
displaying, on the display device that is communicatively connected to the processor, a user interface having one or more areas for receipt of the at least one input selection;
identifying within the user interface which selectable calculation basis parameters can be selected via the user interface;
enabling toggling between the user interface displaying the calculation basis parameters and at least one additional user interface displaying at least one situational parameter along with an initial value assigned to the situational parameter, wherein the initial value can be changed by entry of a different value via the additional user interface;
providing a prompt within the user interface for selection of one of the calculation basis parameters and entry of a corresponding CBP value for use in performing the calculation of the flow trigger; and
in response to not receiving a selection of one or more inputs from among one or more of a parameter and a corresponding value within a pre-established time-out period, returning to a home screen display interface.

8. An apparatus for controlling sampling of an event involving a fluid flow, the apparatus comprising:
a processor;
one or more input devices communicatively coupled to the processor;
at least one output device communicatively coupled to the processor;
a storage device communicatively coupled to the processor and comprising firmware having executable code that is executed by the processor to cause the apparatus to:
receive, within a first user interface via one or more of the input devices, an input selection of at least one situational parameter among multiple selectable situational parameters, each having an associated parameter value, the selected at least one situational parameter comprising at least one of duration, volume per pulse, volume per contact, average daily flow, and volume to be collected;
receive an input selection of at least one calculation basis parameter (CBP) among multiple presented selectable CBP and receive entry of an associated value, the at least one CBP comprising at least one of sample volume, flow trigger, and number of samples;
calculate a first result containing one or more values corresponding to a flow trigger based on at least one calculation basis parameter and value and at least one situational parameters, wherein the at least one CBP is utilized as a focal point around which the FFTC program calculates the first result that corresponds to the flow trigger, which is utilized to control how fluid samples are collected;
calculate a best flow trigger represented by second results that correlate to the at least one input selection of the calculation basis parameter and corresponding value entered and the situational parameters utilized;
output the second results as a listing of result parameters with two sets of calculated values including a first set of raw, unfitted parameter values of the calculation and a second set of best fit parameter values, wherein the best fit parameter values comprise a series of situation-specific values that indicate actual values of the result parameters that will be implemented with activation of a flow trigger program;
enable user modification of at least one situational parameter value of at least one of the result parameters to an updated parameter value for one or more of the situational parameters to be used in a recalculation, based on a user determination of whether or not the second results that are calculated and outputted are acceptable; and
trigger a collection mechanism that is communicatively coupled to the processor to initiate collection of samples of the fluid flow based on the determined one or more values corresponding to the calculated best flow trigger.

9. The apparatus of claim 8, wherein the apparatus outputs, on the output device, a plurality of user interfaces containing a plurality of selectable options and receives the selected at least one situational parameters by one or more of: (a) an input selection of at least one situational parameter and of a corresponding parameter value to assign to each selected situational parameter; and (b) retrieval of at least one stored situational parameter, which includes a corresponding stored parameter value.

10. The apparatus of claim 8, wherein the firmware code that causes the apparatus to calculate the result comprises code for a fluid flow trigger calculation (FFTC) program and the firmware causes the apparatus to:
   execute the (FFTC) program to compute the flow trigger based on an evaluation including (a) the selected one or more situational parameters and (b) the selected at least one calculation basis parameter;
   compute, via the FFTC program, a best flow trigger represented by a calculated best fit result whose values are calculated based on the selected calculation basis parameter and values of the selected one or more situational parameters.

11. The apparatus of claim 8, wherein the firmware code comprises code that causes the apparatus to:
   enable user selection of a different calculation basis parameters;
   in response to a first input selection indicating acceptance of the outputted second results, triggering the sampling mechanism to perform collection of samples based on the best fit result parameter values within the outputted second results; and
   in response to receiving a modification of at least one component utilized in generating the result, performing a new calculation to generate a new result utilizing the FFTC program with parameters and parameter values that account for the modification.

12. The apparatus of claim 11, wherein the raw, unfitted parameter values are actual precise calculated values and the listing of parameters comprises a plurality of parameters from among Trigger, duration, number of samples, volume to be collected, interval between samples, sample volume, and sample count.

13. The apparatus of claim 8, wherein the firmware code further comprises code that when executed by the processor enables the apparatus to:
   receive event data indicating one or more flow conditions of a fluid flow monitored over at least one timeframe, wherein the event data is received from a flow sensor associated with a sampling mechanism;
   in response to receiving the event data, autonomously modify one or more situational parameters, by re-calculating the values of the one or more situational parameters based on the event data received to generate updated values;
   store the updated values in a storage device communicatively coupled to the processor, wherein the updated values are accessible for use during subsequent sampling runs; and
   perform the calculation to determine the flow trigger in at least one subsequent sampling run over a second timeframe utilizing the updated values of the situational parameters.

14. The apparatus of claim 8, wherein the firmware code further comprises code that when executed by the processor causes the apparatus to:
   display a user interface having one or more areas for receipt of the at least one input selection;
   identify within the user interface which selectable calculation basis parameters can be selected via the user interface;
   enable toggling between the user interface displaying the calculation basis parameters and at least one additional user interface displaying at least one situational parameter along with an initial value assigned to the situational parameter, wherein the initial value can be changed by entry of a different value via the additional user interface;
   provide a prompt within the user interface for selection of one of the calculation basis parameters and entry of a corresponding value for use in performing the calculation of the flow trigger; and
   in response to not receiving one or more input of at least one of a parameter and a value 9 within a pre-established time-out period, return to a home screen display interface.

15. The apparatus of claim 8, wherein:
   the calculation basis parameters comprise at least one of sample volume, flow trigger, and number of samples;
   the situational parameters comprise at least one of duration, volume per pulse, volume per contact, average daily flow, and volume to be collected; and
   the code that causes the apparatus to perform the calculation comprises code for calculating a best flow trigger to obtain results that correlate to the at least one input selection of a calculation basis parameter and corresponding value entered and the situational parameters utilized.

16. An application specific integrated circuit comprising the processor and non-volatile storage of claim 8 and at least one interconnect for communicatively connecting to external, off-chip components and devices, and which performs the functions of claim 8.

17. The apparatus of claim 16, wherein the collection mechanism is a component of a sampling mechanism and the apparatus is a separate device from the sampling mechanism, wherein the sampling mechanism includes the collection mechanism that is programmable to collect one or more samples of the fluid flow.

18. A computer program product comprising:
   a tangible, non-transitory, computer readable storage device; and
   program code on the computer readable storage device that when executed by a processor within a flow sampling apparatus causes the apparatus to:
      receive a selection of at least one situational parameter among multiple selectable situational parameters, each having an associated parameter value, wherein receiving the selection of the at least one situational parameter comprises one or more of: (a) receiving an input selection of at least one situational parameter and of a corresponding parameter value to assign to each selected situational parameter and (b) selecting at least one stored situational parameter, which includes a corresponding stored parameter value assigned to the at least one stored situational parameter, wherein the multiple selectable situational parameters comprise at least one of duration, volume per pulse, volume per contact, average daily flow, and volume to be collected;
      receive an input selection of at least one calculation basis parameter among multiple selectable calculation basis parameters and an associated value, wherein the multiple selectable calculation basis parameters (CBP) comprise at least one of sample volume, flow trigger, and number of samples;
      calculate a first result containing one or more values corresponding to a flow trigger based on the selected at least one calculation basis parameter and value and the selected at least one situational parameters, wherein the at least one CBP is utilized as a focal point around which the FFTC program calculates the first result that corresponds to the flow trigger, which is utilized to control how fluid samples are collected;

calculate a best flow trigger represented by second results that correlate to the input selection of the calculation basis parameter and corresponding value entered and the situational parameters utilized;

output the second results as a listing of result parameters with two sets of calculated values including a first set of raw, unfitted parameter values of the calculation and a second set of best fit parameter values, wherein the best fit parameter values comprise a series of situation-specific values that indicate actual values of the result parameters that will be implemented with activation of the flow trigger program;

enable user modification of a parameter value of at least one of the result parameters to an updated parameter value for one or more of the situational parameters to be used in a recalculation, based on a user determination of whether or not the second results that are calculated and outputted are acceptable; and trigger a collection mechanism that is communicatively coupled to the processor to initiate collection of samples of the fluid flow based on the determined one or more values corresponding to the best flow trigger.

19. The computer program product of claim 18, wherein the program code that causes the apparatus to calculate the result comprises code for a fluid flow trigger calculation (FFTC) program and the program code causes the apparatus to:

execute the (FFTC) program to compute the flow trigger based on an evaluation including (a) the selected one or more situational parameters and (b) the selected at least one calculation basis parameter;

wherein the FFTC program computes a best flow trigger represented by a calculated best fit result whose values are calculated based on the selected calculation basis parameter and values of the selected one or more situational parameters.

20. The computer program product of claim 18, wherein the program code comprises code that causes the apparatus to:

wherein the raw, unfitted parameter values are actual precise calculated values and the listing of parameters comprises a plurality of parameters from among trigger, duration, number of samples, volume to be collected, interval between samples, sample volume, and sample count;

enabling user selection of a different calculation basis parameters;

in response to a first input selection indicating acceptance of the outputted second results, triggering the sampling mechanism to perform collection of samples based on the best fit result parameter values within the outputted second results; and in response to receiving a modification of at least one component utilized in generating the result, performing a new calculation to generate a new result utilizing the FFTC program with parameters and parameter values that account for the modification.

21. The computer program product of claim 18, wherein the program code further comprising code the causes the apparatus to:

receive event data indicating one or more flow conditions of a fluid flow monitored over at least one timeframe, wherein the event data is received from a flow sensor associated with a sampling mechanism;

in response to receiving the event data, autonomously modify one or more situational parameters, by re-calculating the values of the one or more situational parameters based on the event data received to generate updated values;

store the updated values in a storage device communicatively coupled to the processor, wherein the updated values are accessible for use during subsequent sampling runs; and perform the calculation to determine the flow trigger in at least one subsequent sampling run over a second timeframe utilizing the updated values of the situational parameters.

22. The computer program product of claim 18, wherein the program code further comprising code the causes the apparatus to:

display, on a display device associated with the apparatus, a user interface having one or more areas for receipt of the at least one input selection;

identify within the user interface which selectable calculation basis parameters can be selected via the user interface;

enable toggling between the user interface displaying the calculation basis parameters and at least one additional user interface displaying at least one situational parameter along with an initial value assigned to the situational parameter, wherein the initial value can be changed by entry of a different value via the additional user interface;

provide a prompt within the user interface for selection of one of the calculation basis parameters and a corresponding value for use in performing the calculation of the flow trigger; and in response to not receiving a selection of one or more inputs from among at least one of a parameter and a value within a pre-established time-out period, return to a home screen display interface.

* * * * *